US009525958B2

(12) United States Patent
Gleim

(10) Patent No.: US 9,525,958 B2
(45) Date of Patent: Dec. 20, 2016

(54) MULTIDIMENSIONAL VIRTUAL LEARNING SYSTEM AND METHOD

(71) Applicant: GLEIM CONFERENCING, LLC, Gainesville, FL (US)

(72) Inventor: Garrett William Gleim, Gainesville, FL (US)

(73) Assignee: Gleim Conferencing, LLC, Gainesville, FL (US)

( * ) Notice: Subject to any disclaimer, the term of this patent is extended or adjusted under 35 U.S.C. 154(b) by 0 days.

(21) Appl. No.: 14/921,828

(22) Filed: Oct. 23, 2015

(65) Prior Publication Data

US 2016/0057557 A1 Feb. 25, 2016

Related U.S. Application Data

(63) Continuation of application No. 14/460,575, filed on Aug. 15, 2014, now Pat. No. 9,185,508.

(Continued)

(51) Int. Cl.
| | |
|---|---|
| *H04R 5/00* | (2006.01) |
| *H04S 7/00* | (2006.01) |
| *H04M 3/56* | (2006.01) |
| *H04B 3/46* | (2015.01) |
| *H04S 5/00* | (2006.01) |

(Continued)

(52) U.S. Cl.
CPC ........... *H04S 7/304* (2013.01); *G10L 21/0202* (2013.01); *G10L 21/034* (2013.01); *G10L 21/10* (2013.01); *G10L 25/72* (2013.01); *H04B 3/46* (2013.01); *H04M 3/568* (2013.01); *H04S 5/00* (2013.01); *H04S 7/30* (2013.01); *H04S 7/302* (2013.01); *H04R 5/02* (2013.01); *H04S 7/305* (2013.01); *H04S 7/40* (2013.01); *H04S 2400/01* (2013.01);

(Continued)

(58) Field of Classification Search
CPC .............. H04R 5/02; H04S 7/302; H04S 7/40; H04S 5/00; H04S 7/305; H04S 2400/01; H04S 2400/11; H04M 3/568; H04B 3/46
USPC ........................................ 381/17; 379/202.01
See application file for complete search history.

(56) References Cited

U.S. PATENT DOCUMENTS

| | | |
|---|---|---|
| 7,346,654 B1 | 3/2008 | Weiss |
| 8,249,233 B2 | 8/2012 | Loupia et al. |

(Continued)

OTHER PUBLICATIONS

International Search and Written Opinion, dated Nov. 13, 2014, from related International Patent Application No. PCT/US2014/051221.

(Continued)

*Primary Examiner* — Paul S Kim
(74) *Attorney, Agent, or Firm* — Greenberg Traurig, LLP

(57) ABSTRACT

A process and system for generating three dimensional sound conferencing includes generating a virtual map with a plurality of positions, each participant selecting one of the positions, determining a direction from each position to each other position on the map, determining a distance from each position to each other position on the map, receiving sound from each participant, mixing the received sound, transforming the mixed sound into binaural audio, and directing the binaural audio sound to each participant via a speaker associated with the virtual position of the speaking participant. The result is a clarified sound that gives to the listening participant a sense of where the speaking participant is positioned relative to the listening participant.

19 Claims, 10 Drawing Sheets

Related U.S. Application Data

(60) Provisional application No. 61/872,068, filed on Aug. 30, 2013.

(51) Int. Cl.
| | |
|---|---|
| *G10L 21/02* | (2013.01) |
| *G10L 21/034* | (2013.01) |
| *G10L 21/10* | (2013.01) |
| *G10L 25/72* | (2013.01) |
| *H04R 5/02* | (2006.01) |

(52) U.S. Cl.
CPC ........ *H04S 2400/11* (2013.01); *H04S 2400/13* (2013.01); *H04S 2420/01* (2013.01)

(56) References Cited

U.S. PATENT DOCUMENTS

| | | |
|---|---|---|
| 2005/0265535 A1 | 12/2005 | Kanada et al. |
| 2006/0212147 A1 | 9/2006 | McGrath et al. |
| 2007/0217590 A1* | 9/2007 | Loupia .................... H04M 1/57 |
| | | 379/202.01 |
| 2007/0279483 A1 | 12/2007 | Beers et al. |
| 2008/0008327 A1 | 1/2008 | Ojala et al. |
| 2008/0144794 A1* | 6/2008 | Gardner ................ H04L 65/403 |
| | | 379/202.01 |
| 2009/0112589 A1 | 4/2009 | Hiselius et al. |
| 2010/0020951 A1 | 1/2010 | Basart et al. |
| 2010/0040238 A1 | 2/2010 | Jang et al. |
| 2011/0196682 A1 | 8/2011 | Sandgren et al. |
| 2012/0192088 A1 | 7/2012 | Sauriol et al. |
| 2013/0010975 A1 | 1/2013 | Tsingos et al. |
| 2013/0222371 A1 | 8/2013 | Reitan |

OTHER PUBLICATIONS

International Search Report and Written Opinion, dated Nov. 13, 2014, from related International Patent Application No. PCT/US2014/051312.

Boustead, P., et al., "DICE: Internet delivery of immersive voice communication for crowded virtual spaces," IEEE Virtual Reality 2005, Proceedings of the IEEE Virtual Reality 2005, Bonn, Germany, Mar. 12-16, 2005, pp. 35-41.

Moeck, T., et al., "Progressive perceptual audio rendering of complex scenes," Proceedings of the 2007 Symposium on Interactive 3D Graphics and Games, New York, NY, US, Jan. 1, 2007, 8 pages.

Extended European Search Report, dated Jul. 20, 2016, from related, co-owned European Patent Application No. 14839874.6.

\* cited by examiner

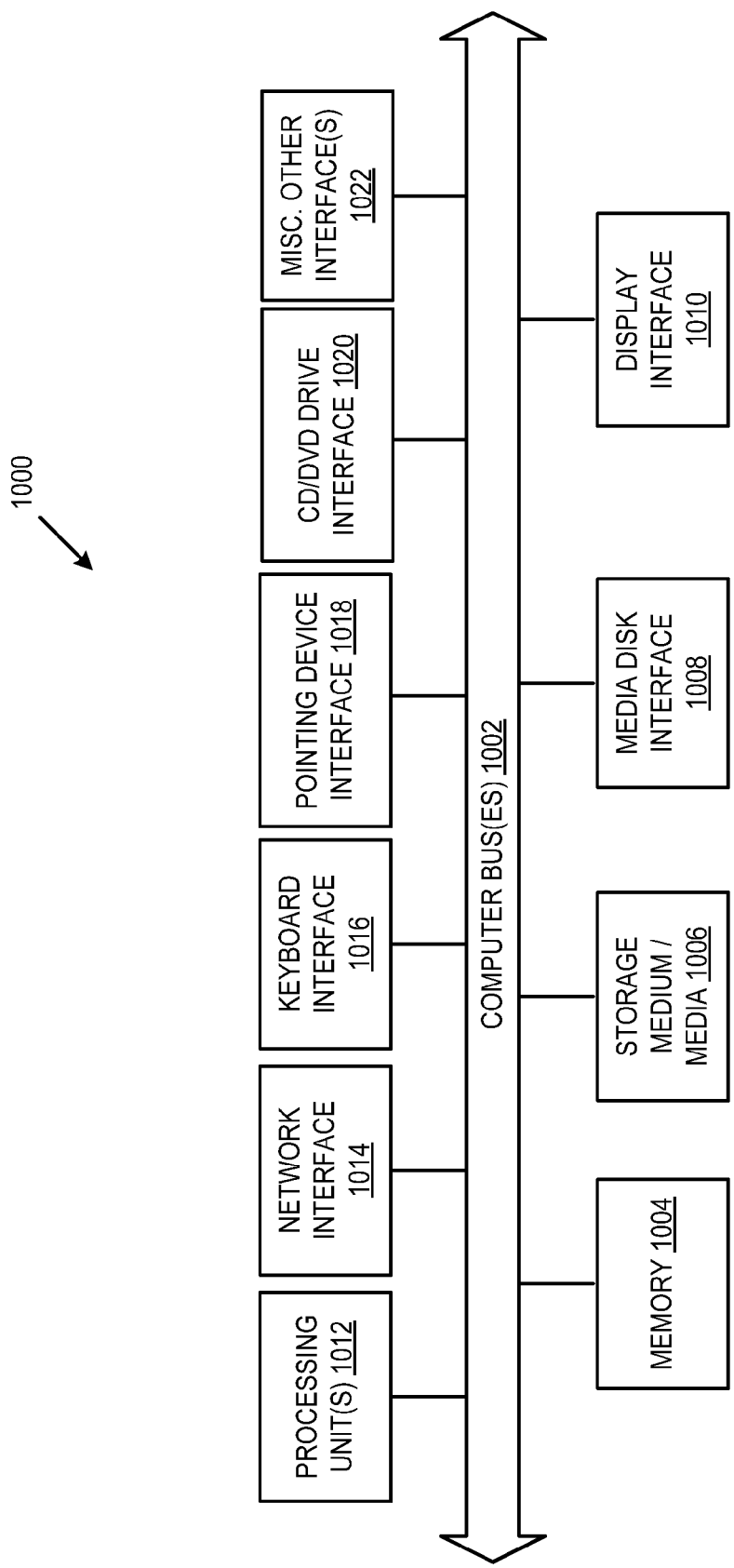

MULTIDIMENSIONAL VIRTUAL LEARNING SYSTEM AND METHOD

CROSS REFERENCE TO RELATED APPLICATIONS

This application is a continuation of U.S. Non-provisional patent application Ser. No. 14/460,575, filed Aug. 15, 2014, entitled Multidimensional Virtual Learning System and Method, which claims the benefit of priority of U.S. Provisional Patent Application Ser. No. 61/872,068, filed Aug. 30, 2013, entitled Multidimensional Virtual Learning System and Method, the content of which is incorporated herein by reference in its entirety. This application is also related to U.S. patent application Ser. No. 14/699,126, filed Apr. 29, 2015, now U.S. Pat. No. 9,161,152, issued Oct. 13, 2015, which is a continuation of U.S. Non-provisional patent application Ser. No. 14/460,575, filed Aug. 15, 2014, entitled Multidimensional Virtual Learning System and Method, which claims the benefit of priority of U.S. Provisional Patent Application Ser. No. 61/872,068, filed Aug. 30, 2013, entitled Multidimensional Virtual Learning System and Method.

BACKGROUND OF THE DISCLOSURE

Teleconferencing, conferencing, and distance learning systems share a similar drawback: the inability for participants to distinguish and understand multiple voices speaking simultaneously. Teleconferencing is a popular method of communication between multiple people. During a teleconference it is difficult to have conversations in which more than one person speaks. This is caused by the way existing teleconferencing systems mix together the voices of multiple speakers. Distance learning systems, such as webinars and virtual classrooms, also have the same issue. While distance learning systems involving a virtual classroom are known, there is no way for more than one person to speak at a time in which a listener can readily differentiate between speakers. Furthermore, the entire experience is relatively one dimensional. What is needed is an enhanced virtual learning system in which the participant can feel he or she is really experiencing an actual classroom environment with each user or participant having the ability to distinguish between multiple voices.

SUMMARY OF THE DISCLOSURE

The present disclosure directly addresses this problem. In one embodiment of the present disclosure, in which a person talks to another user of the system, the words spoken and heard by the user are not from just a disembodied voice but from the person at a predefined location, for example, sitting right next to the user in the virtual classroom, webinar, or conference. Thus the system in accordance with the present disclosure involves a novel 3D Sound Conferencing system. A 3D Sound Conferencing system makes it possible to have a conversation in which more than one person speaks at the same time by restoring the sound cues present in real life. In particular, each person in a 3D Sound conference is associated with a position in a map of a virtual room. This room can be used in a teleconference, webinar, electronic conference, electronic chat room, virtual classroom, or any group meeting where there is sound. The sound is then transformed so that each person in the virtual room hears the sound of the other people as if their voices originated from their specific location in the virtual room. In this way the direction information in the sound allows humans to more easily distinguish one voice from another. Thus, if multiple people speak at the same time, an individual can distinguish the different voices and directions of each voice. This allows a group conversation to occur electronically in a manner similar to real life, and thereby enhances the experience in such an environment.

Throughout this specification, reference is made to a conference participant, a plurality of participants, etc. It is to be understood that a participant may be a listening participant and/or a speaking participant. In addition, reference is made to a conference, conferences and conferencing and it is to be understood that a conference is any form of a conference communication, including but not limited to telecommunications, conference calls, virtual classrooms, webinars, electronic group meetings, and combinations of conference communication forms. Furthermore, it is to be understood that a conference may be comprised of n participants, where n represents any number.

One embodiment in accordance with the present disclosure is a multidimensional sound conferencing method. This method includes operations of: generating a map of a virtual room having a plurality of predefined positions; determining a direction in the virtual room from each predefined position to each other predefined position in the virtual room; assigning or associating a conference participant to each of the positions on the map; assigning a virtual speaker associated with each position; receiving sound from a speaking one of the participants; converting the voice sound to a converted sound corresponding to each of the predefined positions such that the converted sound corresponds to its direction from the one of the positions assigned to the speaking one of the participants directing the sound to the virtual speaker associated with the speaking participant's position on the map; and transforming the sound directed to the virtual speaker to binaural audio sound. This virtual map may include a sound ring or "soundring" around the positions. In such an embodiment, each virtual speaker is associated with a position around the sound ring.

In one embodiment the virtual room may have a plurality of walls defining the room. These walls may facilitate introducing reverberation, or reverb, into the sound transmitted to each virtual speaker at each position around the sound ring. The amount of reverb may be determined from the incident and reflection angles of sound transmitted from the speaking participant's position in the virtual room against an object such as another person, a chair, or one or more of the walls defining the room to a particular listening participant.

A method for simulating a three dimensional audio experience during a conference between a plurality of participants, in one embodiment, includes: receiving a plurality of voices; associating each voice to a unique participant; presenting to each unique participant a virtual map of a virtual room showing a plurality of different positions in the room equal to or greater than the number of unique participants; each participant selecting a different position on the map within the virtual room; modifying each voice according to its position on the map into a modified voice; and transmitting the modified voice to each of the other participants. The method further includes determining a direction from each position in the room to each other position in the virtual room and associating a different speaker with each different position in the virtual room. Each modified voice may preferably be determined from the direction of the speaker associated with its position in the room.

Another embodiment of the disclosure is a method for simulating three dimensional audio experiences in a conference. This method includes generating a map of a virtual room having a plurality of different predetermined positions on the map, presenting the map to a plurality of conference participants, and either having each participant select one of the different positions or assigning a different one of the positions to each participant. The system then receives a voice from a speaking one of the plurality of participants. The received voice is then modified according to the selected position of the speaking one of the plurality of participants and then the modified voice is transmitted to each other participant according to the direction of each other participant from the selected position of the speaking participant. The method may also include assigning a virtual speaker to each predetermined different position on the map and transmitting the voice from the speaking participant to each of the other participants from the virtual speaker assigned to the speaking participant.

An embodiment of the method of generating three dimensional sound conferencing in accordance with the present disclosure can include generating a map with a plurality of positions, each participant selecting one of the positions, determining a direction from each position to each other position on the map, determining a distance from each position to each other position on the map, receiving sound from each participant, mixing the received sound in accordance with the speaker's selected position, transforming the mixed sound into binaural audio, and directing the binaural audio sound to each participant via a virtual speaker associated with the position of the speaking participant.

Further features, advantages and characteristics of the embodiments of this disclosure will be apparent from reading the following detailed description when taken in conjunction with the drawing figures.

DESCRIPTION OF THE DRAWINGS

FIG. 10 is a block diagram illustrating an internal architecture of a computer utilized in accordance with an embodiment of the present disclosure.

DETAILED DESCRIPTION

Figure 1:
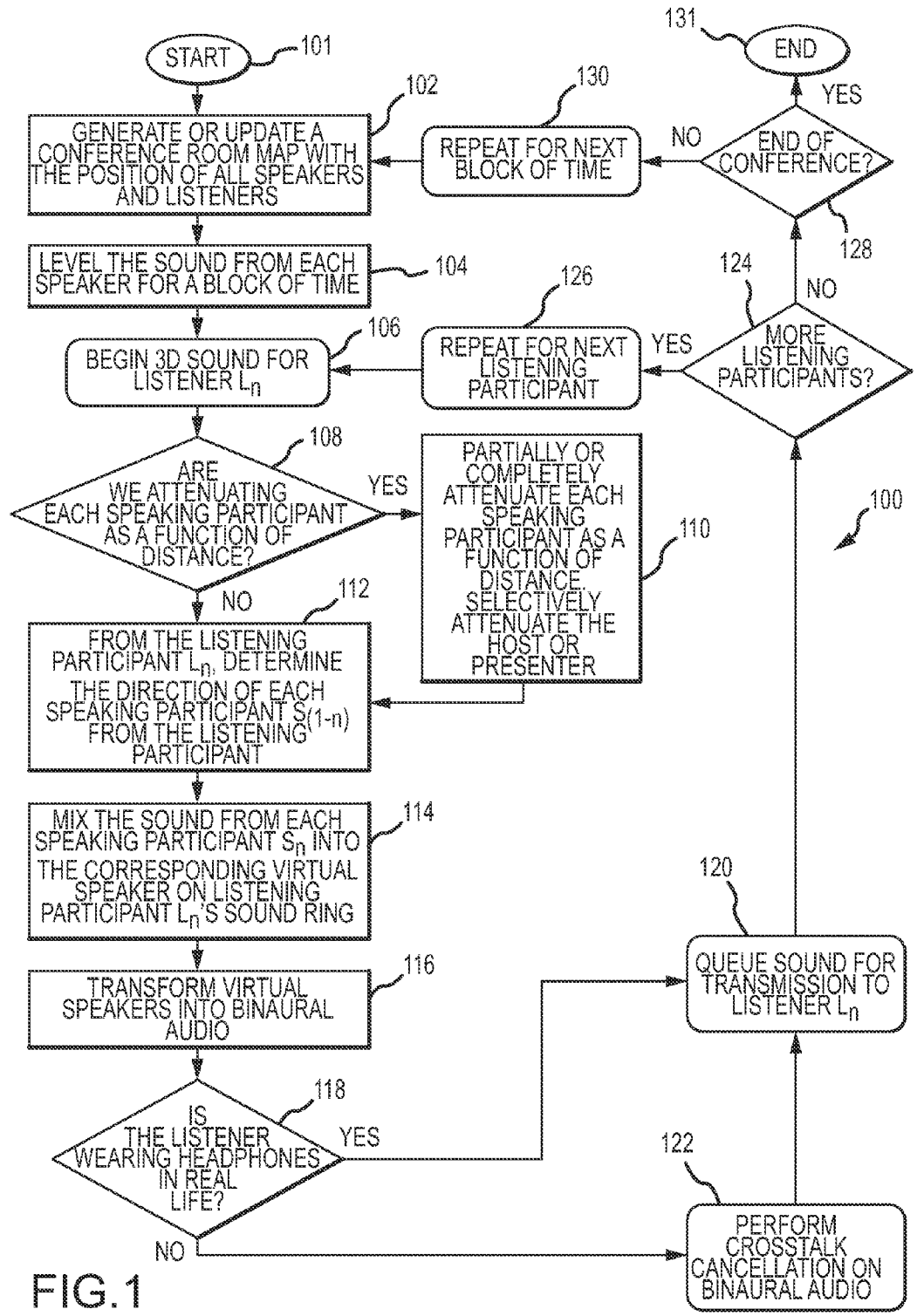
FIG. 1 is flowchart of the 3D Sound Conferencing process for a flat room with no acoustic effects from changes in elevation and no reverberation.

In the following description, for purposes of explanation, numerous specific details are set forth in order to provide a thorough understanding of the description. It will be apparent, however, to one skilled in the art that the invention can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. Throughout the description that follows, reference will be made to a speaking participant and a listening participant. Each participant may be either a speaking or a listening participant depending on what the participant is doing at the moment. In addition, even when a participant is speaking, it should be understood that he or she can be concurrently listening.

Concisely, 3D Sound is sound which contains cues that convince the listener that the source of a sound is in a specific location, direction, and distance from this listener. 3D Sound differs from surround sound in that surround sound just tries to surround you with sound but does not, in general, accurately recreate specific location, direction, and distance. The term 3D sound refers to the fact that most surround sound is limited to surrounding you with sounds seeming to original from a two dimensional plane, disc, or ring around your head, whereas 3D sounds can seem to originate from any location, direction, and distance in three dimensions, such as a sphere, ball, or helmet around your head.

Technically, commercial software uses 3D Sound to refer to machine generated binaural audio. In binaural audio, a pair of microphones is placed inside the ear canal of a real person, or a dummy head, to make a recording. When the recording is played back with headphones or earphones or otherwise manipulated to generate these recorded sounds at a location in the listener close to where the microphones were placed—in or near the ear canal—then the direction cues perceived by the listener of the original recording are reproduced on playback and the listener accurately perceives 3D Sound.

Sounds can be recorded in binaural by using microphones placed inside a dummy head. Most sound recording are not made with a dummy head. These sound recordings can be transformed into recordings that generate all the directional cues that would have been present had the recording been made with a dummy head. This is a function of the anatomy of the head. This function is called the Head Related Transfer Function (HRTF). As an example, three important direction cues incorporated into the HRTF are the interaural time difference (ITD), the interaural level difference (ILD), and the reverberation in the pinna. ITD is the difference in arrival time for a sound at each ear—a sound coming from the left arrive at the left ear slightly before it arrives at the right ear. ILD is the difference in loudness—a sound coming from the left is slightly louder at the left ear than it is at the right ear, because the head absorbs some of the sound and creates a "sound shadow" which has the right ear inside. Reverberation in the pinna refers to the reflection of sound by the shapes and anatomical features of the pinna, the flap of tissue that makes up the visible part of the ear. All of these effects are combined into one transformation of a sound into a 3D Sound, and the quality and performance of this transformation is a subject of competition between various 3D Sound commercial software vendors.

Figure 2:
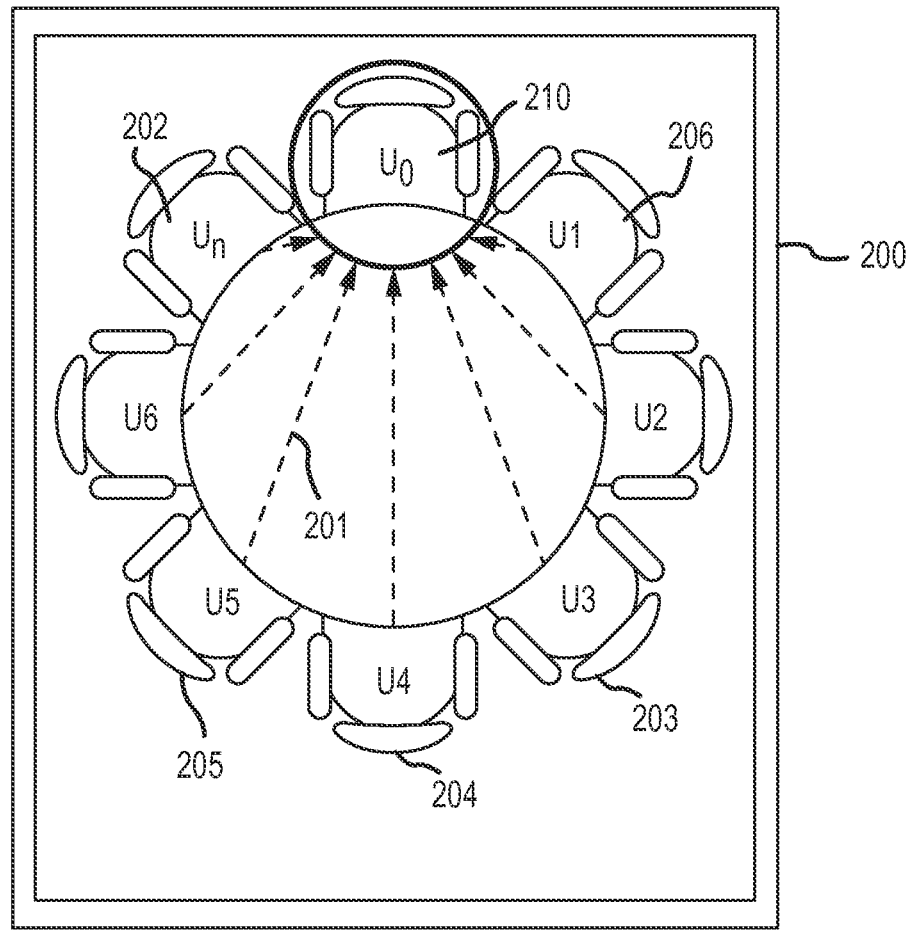
FIG. 2 is a diagram of a representative small conferences room showing directional sound without the effects of changes in elevation or reverberation.

An exemplary embodiment of a process/method 100 of generating a 3D sound conference is shown in the flow diagram of FIG. 1. The process begins in operation 102 in which a virtual conference room map 200, an example of which is shown in FIG. 2, is generated in software or updated and displayed on a host computer. This map may be called up on a potential participant's computer display screen. Each potential user, i.e. a participant "$U_n$," 202, then accesses this map 200 from a remote computer connected to the software on the host computer via the Internet.

Once the map 200 is generated and displayed to a plurality of potential participants on their remote displays, each of the potential participants selects a position, such as $U_n$ 202, i.e. one of the chairs on the map shown in FIG. 2. Alternatively, each of the participants is assigned a position on the map 200. Once the desired number of participants have each selected a seat, or been assigned a seat on the map on their display screens, control transfers to operation 104.

In operation 104, each participant speaks and the sound picked up from each participant when speaking is leveled. This may be done initially by asking the participant to say his or her name, or recite a predetermined phrase or the like, during a predetermined block of time, and then in operation 104 is updated automatically for each interval of time. In addition to providing consistent volume and verifying microphone operation, leveler 104 provides the important function of removing the direction cues about where the speaking participant is relative to a physical microphone so that the system can replace those cues with computer generated cues about where the speaking participant is in the virtual room map. When the sound is leveled for each speaking participant control transfers to operation 106.

In operation 106, 3D sound is generated for each listening participant. A listening participant is identified as "$L_n$". More particularly, basic 3D sound generation is explained. Here the sound received in operation 106 is converted into a converted sound for each listening participant. This converted sound is slightly different for each position on the map shown in FIG. 2 according to the direction of each position from the position associated with a speaking participant who generated the sound received. For example, in a virtual room with 8 positions in a circle, the converted sound received from a speaker in position U1 would be changed differently for sending to each of positions U2 through U6, according to the particular direction between positions U1 and U3, U1 and U4, U1 and U5, U1 and U6, etc. The listening participant 204, U4, for example, will perceive the converted sound from the speaker in position 205, U5, as if it was coming from his/her left. Similarly a listening participant 204, U4, would perceive the converted sound from the speaker in position 203, U3, as if it was coming from his/her right. Thus the converted sound received from position 206, U1, is converted differently according to the listening participant's position direction from the speaking participant. Control then transfers to query operation 108.

Query operation 108 asks whether the software functionality has been selected to attenuate each speaking participant as a function of distance from a speaking participant. If the answer is yes, then control transfers to operation 110. If the answer in query operation 108 is no, then control transfers to operation 112.

In operation 110, each speaking participant's voice that is to be sent to each listening participant is partially or completely attenuated as a function of distance from that listening participant to the speaking participant. Control then transfers to operation 112. In other words, if there is a large table map, participants at the ends of the table will sound further away than participants sitting closer to the listening participant.

In operation 112, from each listening participant $L_n$'s position on the map 200, the direction of each other participant, i.e., each other speaking participant Sn is determined. This information is then stored, for example, in a lookup table in a database associated with the conference, for immediate access. Control then transfers to operation 114.

In operation 114, the sound from each speaking participant Ln is mixed together with each adjacent speaking participant's sound based on their relative positions in the virtual room and their direction from each adjacent speaking participant. Control then transfers to operation 116.

In operation 116, the mixed sound from each speaking participant in the virtual room is transformed into binaural audio. Control then transfers to query operation 118. In query operation 118, each listening participant identified on the virtual map is queried whether he or she is actually wearing headphones.

It is to be understood that this operation 118 may be alternately done out of sequence, for example, as part of sound leveling activity in operation 104, and this information can just be checked or assumed to have not changed here. However, for purpose of description, it has been placed here. Furthermore, query operation 118 may be implemented every second, third or fourth iteration, for example, rather than during each iteration as herein described.

If the listening participant is wearing headphones, then control transfers to operation 120 where the sound is queued for transmission to each listening participant $L_n$. Alternatively, if the listening participant is not wearing headphones, control transfers to operation 122.

In operation 122, a crosstalk cancellation operation is performed on the binaural audio signal to each participant $L_n$ in order to provide the same effect with the speakers as is achieved with the headphones. Control then transfers to operation 120 where the binaural sound is queued for transmission to the listening participant $L_n$ and transmitted automatically thereafter. It is to be understood that transmission may optionally be done out of sequence, for example, after query operation 124, if there are no more participants to be accounted for. However, for purpose of this description, transmission is described here.

When binaural sound is cued, then control transfers to query operation 124. Query operation 124 asks whether there are any more participants in the virtual room in the conference during this particular time block. If yes, control transfers in operation 126 back to operation 106 where 3D sound is generated for the listening next participant $L_n$. The sequence from 106 to 124 is then repeated until there are no more listening participants in query operation 124. When this occurs, control transfers to operation 128, where the query is made whether it is the end of the conference. If not, control transfers to operation 130 which instructs the program to repeat all operations from 102-128 for the next block of time.

This sequence of operations 100 takes place relatively quickly such that it may be transparent to the participants in the conference. For example, the block of time involved in each iterative set in the sequence of operations in process 100 may be is typically in the range of 1 to 500 milliseconds.

3D Sound Conferencing can be made to emulate a variety of real and virtual venues or rooms. A different embodiment is used for small, medium, and large conferences, though the sophisticated features used for larger conferences can certainly also be applied to smaller ones, and the methods of smaller conferences can be applied to larger ones.

For small venues, typically those with 1-25 participants such as conference room 200 in FIG. 2, we typically use the no reverberation method of FIG. 1. At the initiation of the meeting 101, the conference room map, such as 200, is generated and each of n participants, also referred to users $U_0$ through $U_n$, chooses a seat. Alternatively, each of the n users may be assigned a seat within the conference room map. Each user $U_0$ through $U_n$ is also referred to as speaking participant $S_0$ through $S_n$ when we are concerned with their speaking function and as listening participant $L_0$ through $L_n$ when we are concerned with their listening function.

Next we use sound leveler 104 to level the sound from each speaker. Sound levels change all sounds to a similar volume and there are commercially available sound levelers, such as the AudioCauldron Compressor Engine from Bit Cauldron Corporation. A sound level is typically used so that one song is not considerably louder than the song before or after it. In this case we will be using a sound leveler for a different reason: the volume level can tell us how loud someone is talking, but it also tells us how far a speaker is from their physical microphone. For 3D sound conferencing, we intentionally level the sound to remove the information about how far the speaker is from their physical microphone so that we can then use an attenuator to intentionally add negative or positive volume information that communicates the distance between the speaker (speaking participant) and the listener (listening participant) in the mapped room.

Not all speakers have their volume attenuated as a function of distance for all listeners. Decision 108 shows that we may want to selective apply either complete, partial, or no attenuation to a specific speaker for a specific listener (listening participant). There are several reasons to do this. First, the attenuation information may do more harm than good to a person who is hard of hearing and that person will benefit more from a louder sound than from the distance information conveyed by volume. We call this feature Hearing Aid Clarity, and this feature may be turned on or off by each individual listener. Hearing Aid Clarity can also be turned on and off by the host/administrator of the conference or meeting.

Second, in situation where there is one instructor, or host, doing the majority of the talking, it may be desirable to make the host's volume such that the host appears to be at a very short distance from everyone. All of the other direction cues are still present for the host, and all the direction cues are still present for all the other speakers (speaking participants), we just make the host sound as if you have a front row seat. When the host voice is made to sound a short distance from a speaking participant while otherwise preserving the map, we call this feature Up Close Instruction. Up Close Instruction may be applied to more than one host, and may be turned on and off by each individual listener (listening participant) or maybe turned on and off by the host/administrator of the conference or meeting. The processes described above may be performed in the cloud or much of the calculation processing may be pushed to the end user's device such as his or her computer, desktop, tablet, computer, smart phone, electronic glasses, or other information processing device.

Figure 3:
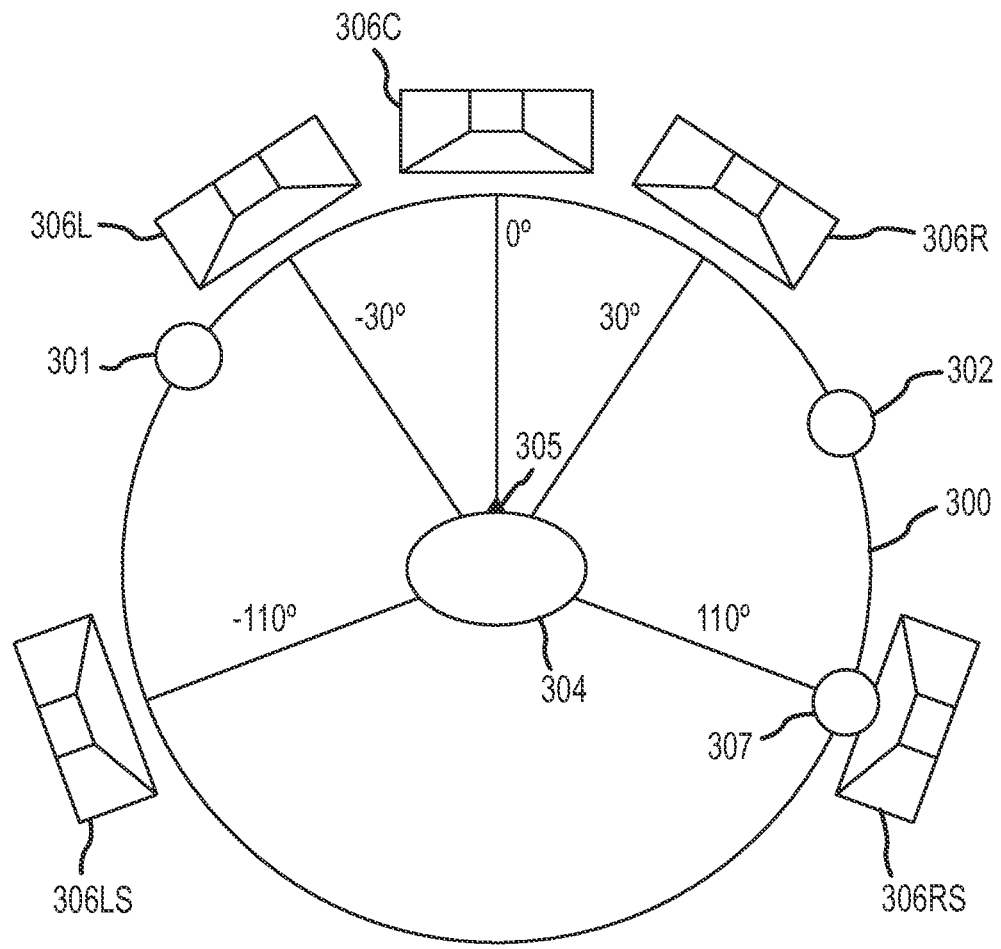
FIG. 3 is a sound-ring with directional sounds and virtual speakers.

After managing the volume and distance cue from each speaking participant to the listener, i.e. listening participant, the geometry of conference room map 200 is used in calculator operation 112 to calculate the direction of the sound from the speaking participant to the listening participant. Each direction may be expressed as an angle on Sound ring 300 in FIG. 3. A Sound ring 300 may be visualized as a ring around the listening participant, for example, listening participant 304, that represents the angle of the sound direction relative to the forward facing angle of the listening participant 304, as indicated by the position of the listening participant's nose 305 from the overhead view of FIG. 3.

Each sound on sound ring 300 may arrive at an arbitrary angle. The sounds at arbitrary angles along the sound ring are then mixed into a fixed number of adjacent angles where virtual speakers have been placed. There may be a very large number of virtual speakers, such as 720 speakers, one every half degree, so that each sound can simplest be moved to the nearest virtual speaker. It is more common to use a smaller number of virtual speakers, such as a virtual speaker every five degrees or even five virtual speakers total, as in the popular ITU-R BS 775 configuration shown for speakers 306L, 306R, 306C, 306LS and 306LR. If a sound lands directly on a virtual speaker it is simply mixed entirely into that virtual speaker, such as sound 307 landing on virtual speaker 306RS. If a sound lands directly between two speakers it can be mixed evenly into those two speakers, as with sound 302 getting mixed into virtual speakers 306R and 306RS. If a sound is unevenly between speakers, such as sound 301 part way between speakers 306L and 306LS, the sound can be mixed into the nearest neighbor or mixed proportionally between the adjacent virtual speakers, the latter of which is the method used by mixer 114.

The sound is then transformed from the virtual speakers on the sound ring to the sound that would be perceived by human ears in this actual situation, called binaural sound. The converter operation 116 from sound for virtual speakers to binaural sound is available from commercial software packages, such as the AudioCauldron Headphone Engine from Bit Cauldron Corporation.

Binaural sound is intended for headphone listening. Query operation 118 checks if the user is wearing headphones. If the user is wearing headphones then the sound is ready to be sent onward through the process. If the user is not wearing headphones but is instead listening with external physical speakers, then we must cancel the crosstalk effect introduced by the physical speakers in order to maintain accurate direction information. Crosstalk canceller operation 122 uses crosstalk cancellation available from commercial software packages, such as is currently available via the AudioCauldron Speaker Engine from Bit Cauldron Corporation.

The process as described to this point creates the directional sound for one listening participant. The process must be repeated to create the sound for each listening participant. All of this processes the sound for all listening participants for a single short interval of time, for example, within 1-500 milliseconds. This process must then be repeated for the next short interval of time.

For small venues, typically those with 1-25 participants such as a virtual conference room 200 in FIG. 2, we typically use the no reverberation method of FIG. 1. For medium size venues, typically those with 26-100 participants, there are more people sitting closer together and it can be helpful to distinguish one speaking participant from another by adding the additional differentiating cue of reverberation. Any type of reverberation or lack of reverberation can be applied to any room size, and what is described herein is merely exemplary. Therefore the room of room map 200 can be used for a detailed conceptual description of the reverberation cue.

Figure 4A:
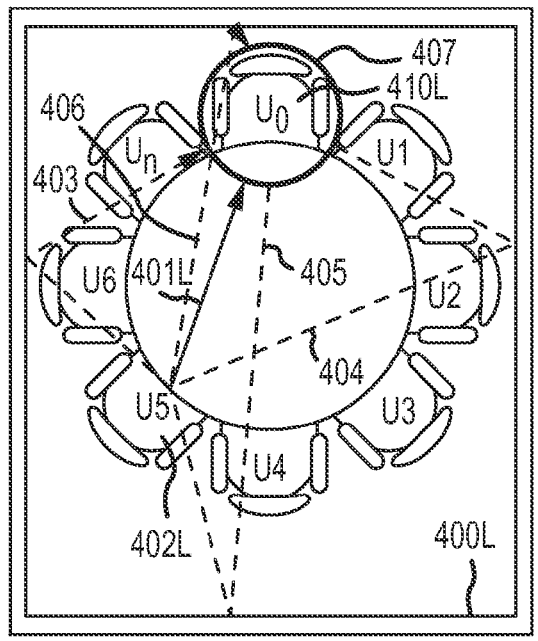
FIG. 4A is a 2.5D map, a two dimensional map with some 3D characteristics, of a conference room showing the direct and reverberated paths of a sound.

Room map 200 shows direct sound path 201 from speaking participant $U_S$ 205 to listening participant $U_O$ 210. The direct path is not the only path sound travels. FIG. 4A shows the reverberant paths, the paths sound travels via reflections off of surfaces in the room. Room map 400L shows the same room map as room map 200 and the same direct path 401L as path 201. FIG. 4A also illustrates reverberant path 403 off of the left wall, 404 off of the right wall, 405 off of the rear wall and 406 off of the front wall. Sound arrives later on these paths because it has farther to travel. These paths also arrive at the sound ring 407 at different locations and directions than direct path 401L.

Figure 4B:
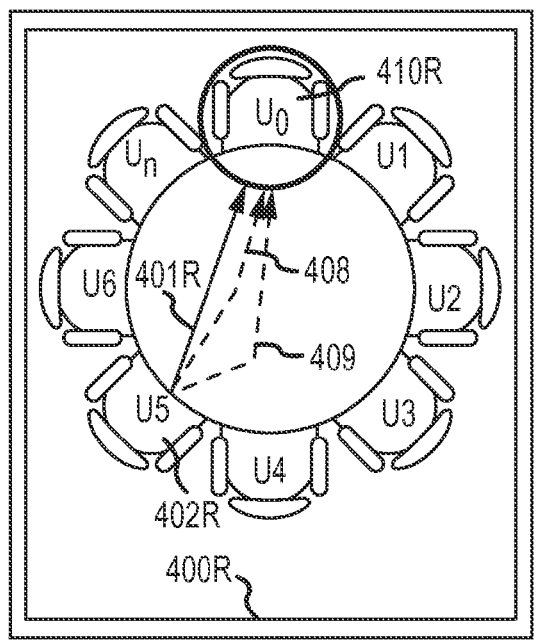
FIG. 4B is a 2.5D map with some 3D characteristics, of a conference room showing the direct and reverberated paths of a sound.

The two dimensionally calculated (2D) reverberations of room 400L are sufficient to add reverberation cues that are specific to each speaking participant. Reverberation can be made to sound more natural when taking height into account. Height is taken into account in two ways. First room map 400R of FIG. 4B shows that direct path 401R also has reverberant path 408 off of the table and 409 off of the ceiling. Second, all of the participants no longer need to be at the same height. For example, the host can be standing and all of the other participants can be sitting. This additional height information does not represent all possible three dimensional (3D) information, but is considerably more information than the two dimensional information, so we refer to it as 2.5D information.

Figure 6:
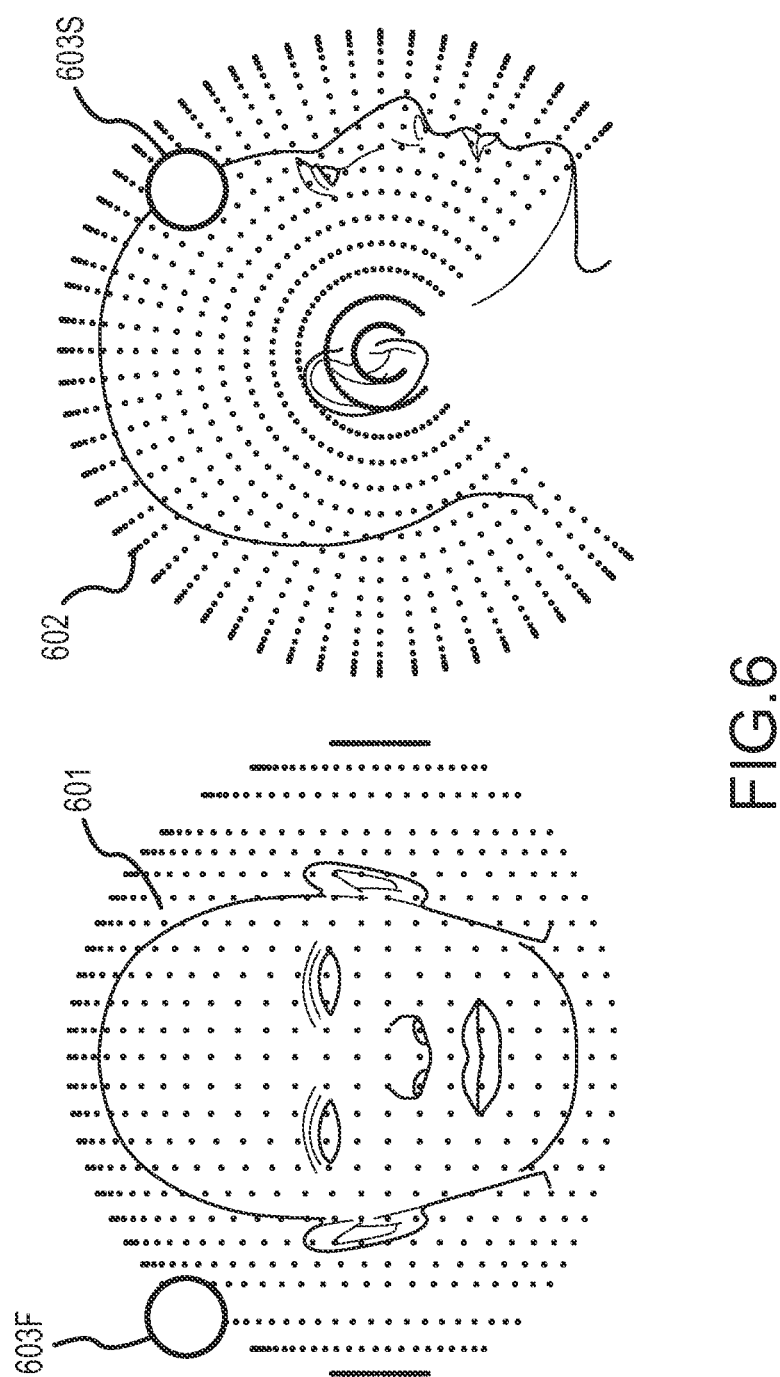
FIG. 6 is a sound helmet with directional sounds and virtual speakers.

2.5D and 3D calculations introduce a new dimension to the sound ring. In particular, it now allows that a sound's direction need not sit on a sound ring around a person's head, but could originate from any direction, making the sound ring a sound sphere. We exclude the directions that are inside your body and your shoulders from the sound sphere and come up with a portion of a sound sphere, which we call a sound helmet. FIG. 6 shows a sound helmet as a set of discrete points 601 and 602. Virtual speakers could be placed onto each point, between points, or on a subset of points. The conference system generates elevation information from the mapping of the room, which may include sloped floors or steps, multiple levels, people and objects of different heights, and other information that determines the elevation of participants, sounds, and reverberated sounds.

Figure 5A:
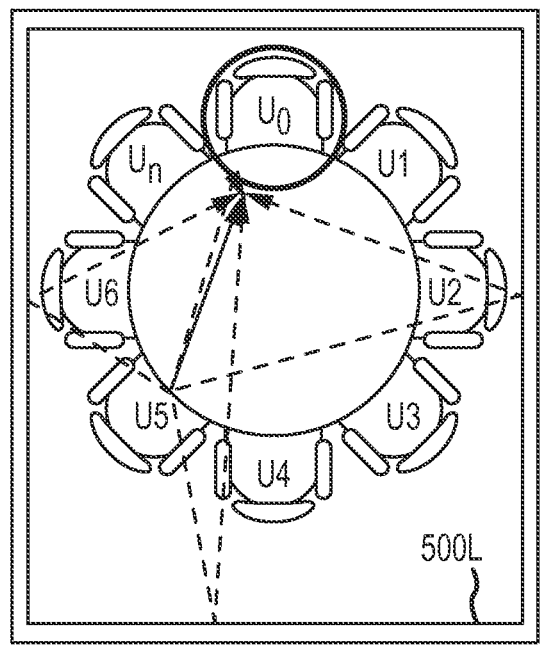
FIG. 5A is a 2.5D conference room map with simplified reverberation.
Figure 5B:
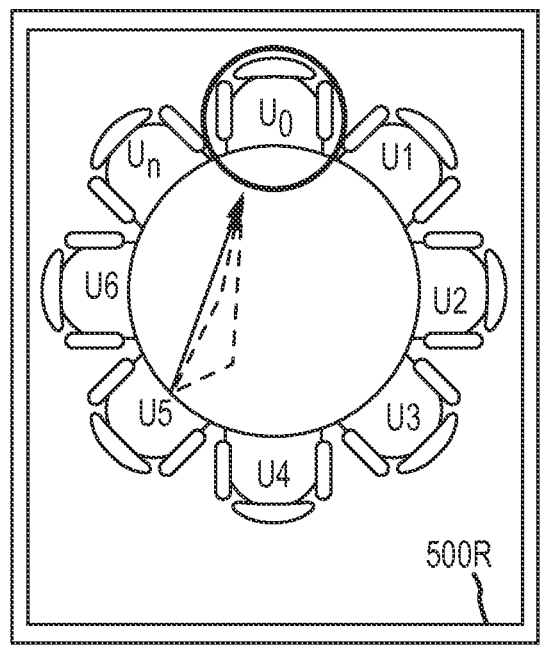
FIG. 5B is a 2.5 D conference room map with simplified reverberation.

An embodiment could calculate reverberation by placing the sound of each reverberant path at a different location on the sound ring 407, as is shown in FIG. 4A, or a sound helmet. In order to both use 2.5D and 3D reverberation and maximize the energy of the sound cue at the direction of the direct path, we simplify the reverberation by moving the sound of all reverberant paths to the location where the direct path intersects the sound helmet, shown in FIG. 6, point 603F in front view 601 and point 603S in side view 602. These simplified paths are also shown in FIGS. 5A and 5B for sound maps 500L and 500R. Simplified reverberation can give a slightly different sound to each speaking participant and improve the experience of having a group conversation, especially in rooms with 26 to 100 people, but can be performed on rooms with any number of people.

Figure 8:
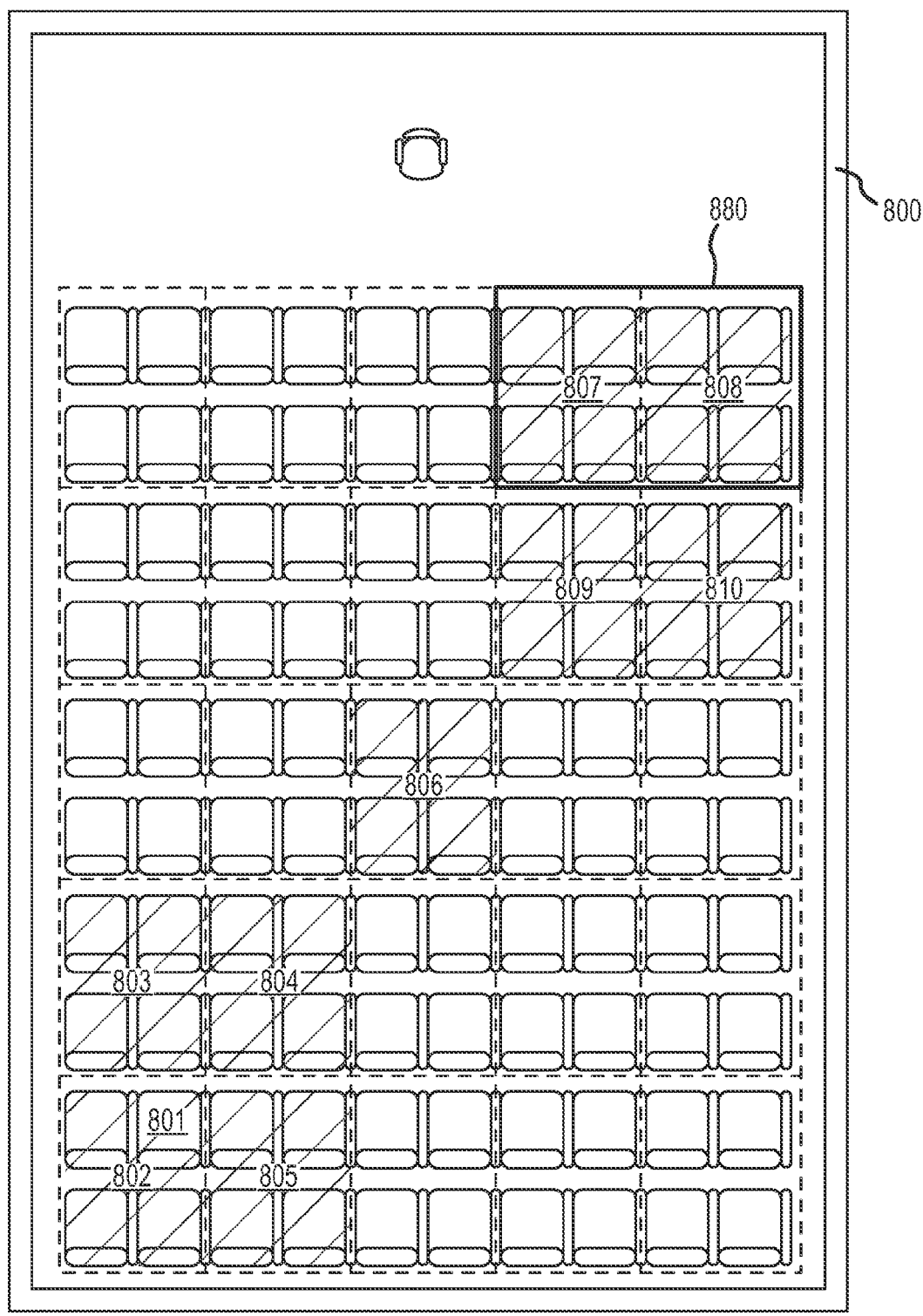
FIG. 8 is a diagram of a representative 100 seat hall where seats have been grouped into blocks and blocks have been grouped into superblocks.

For large venues, typically rooms with more than 100 people, our large venue embodiment also employs blocks and superblocks. Blocks are contiguous groups of people. FIG. 8 shows 100 seat hall 800. The person in chair 801 is a member of block 802. Superblocks are contiguous groups of blocks. For example, the highlighted superblock 880 in FIG. 8 is made up of block 807 and 808.

For groups with 100 or less people, it is possible for everyone to participate in a group conversation. For groups of more than 100 people, it becomes less likely that there are more than a few speaking participants engaged in a discussion at once, and it becomes more likely the participants are in a venue, such as a sports arena, with many participants speaking at once. In sports arena settings, the compute power requirements can be significantly reduced without a noticeable change in quality through the use of blocks and superblocks. The use of blocks involves three steps. After dividing the venue into blocks, we ignore the blocks for all blocks adjacent to or encompassing the listening participant and calculate the sound from individual speaking participants. Next, for blocks at a reasonable distance, all of the speaking participants in one block are mixed together into one speaking participant, and that one speaking participant is treated with one direction. Finally, for speaking participant blocks far away blocks can be mixed into superblocks and the superblock can be treated as one speaking participant.

Figure 7:
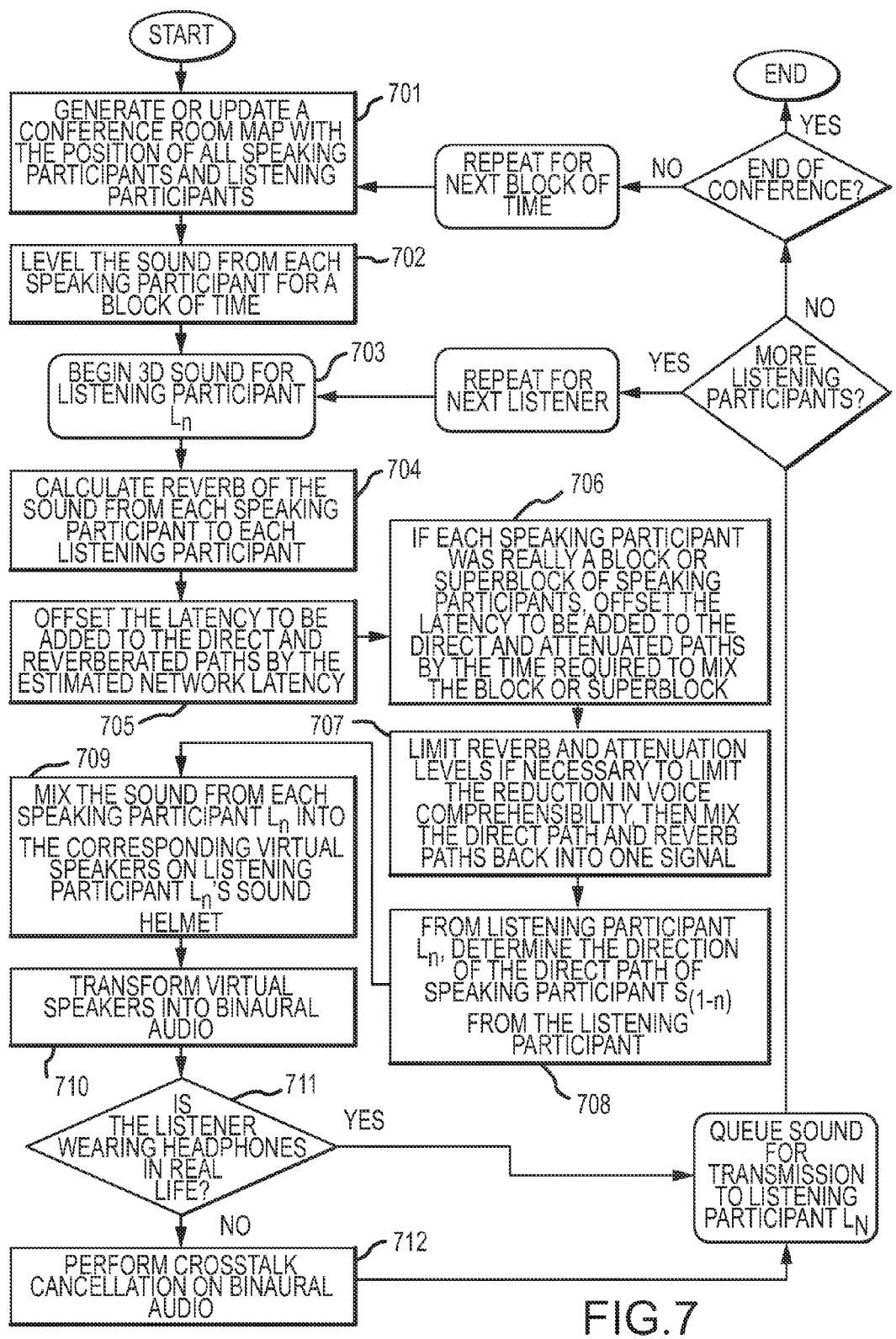
FIG. 7 is a flowchart of the 3D Sound Conferencing processes.

By taking the small venue method of FIG. 1, adding reverberation for medium venues, and adding blocks and superblocks for large venues, a flowchart of operations to provide 3D sound conferencing for any venue can be generated. This process is shown in FIG. 7.

At the initiation operation of the meeting 701, the virtual conference room map, such as 200, is generated. In one embodiment, the administrator chooses a seat for each of n users. In another embodiment, each of n users, $U_O$ through $U_n$, chooses his or her own virtual seat. Each user $U_O$ through $U_n$ is also referred to as speaking participant $S_O$ through $S_n$ when we are concerned with their speaking function and as listening participant $L_O$ through $L_n$ when we are concerned with their listening function.

Next we use sound leveler in operation 702 to level the sound from each speaking participant. Sound levels change all sounds to a similar volume and there are commercially available sound levelers, such as the AudioCauldron Compressor Engine from Bit Cauldron Corporation. A sound level is typically used so that one voice, such as a song, is not considerably louder than the song before or after it. In this case we will be using a sound leveler for a different reason: the volume level can tell us how loud someone is talking, but it also tells us how far a speaking participant is from their physical microphone. For 3D sound conferencing, we intentionally level the sound to remove the information about how far the speaking participant is from their physical microphone so that we can then use reverberator operation 704, which also provides attenuation, to intentionally add volume information that communicates the distance between the speaking participant and the listening participant in the mapped room. The sound leveling also removes bogus information distance cues so that when the sound goes to binaural sound, the Bit Cauldron engines can add proper distance to the sound cues and the sound cues are not distorted because, for example, one speaker is 5 feet from his/her microphone.

Reverberator operation 704 calculates reverberation using the method of having all of the reverberation paths arrive at the same point on the sound helmet, and then assigning all of the sound paths summed together to that direction.

An interesting phenomenon happens in large venues, such as that portrayed in FIG. 8. The speed of sound is approximately 1 foot per millisecond (approximately 1000 ft per second) and network latencies are typically on the order of 50 ms to 100 ms. Latency offset block operation 705 subtracts the expected latency of the network from the actual latency caused by air. For example, if the sound path was 100 feet in distance and the expected network latency was about 50 ms, then offset block 705 would intentionally add only 50 ms of latency to the path, and the total delay of added latency plus network latency would equal the desired latency of 100 ms.

Next, if the speaking participant's sound being processed is actually part of a block or superblock, offset block operation 706 further reduced the added latency to offset the time required to compute the block or superblock.

Not all speaking participants have their speaker volume attenuated as a function of distance for all listening participants. Adjustment operation 707 shows that we may want to selective apply either complete, partial, or no attenuation to a specific speaker for a specific participant listener. There are several reasons to do this. First, the attenuation information may do more harm than good to a person who is hard of hearing and will benefit more from a louder sound than from the distance information conveyed by volume. We call this feature Hearing Aid Clarity, and this feature may be turned on or off.

Second, in a situation where there is one instructor participant or host in the conference doing the majority of the talking, it may be desirable to make the host's volume such that the host appears to be at a very short distance from everyone. All of the other direction cues are still present for the host, and all the direction cues are still present for all the other speaking participants, we just make the host participant sound as if the listening participant has a front row seat. When the host voice is made to sound a short distance from a speaking participant while otherwise preserving the map, we call this feature Up Close Instruction. Up Close Instruction may be applied to more than one speaking participant, and may be turned on and off.

Along with managing the volume and distance cue from each speaking participant to the listening participant, the geometry of conference room map 200 is used in calculator operation 708 to calculate the direction of the sound from the speaking participant to the listening participant. In FIG. 1, each direction was expressed as an angle on Sound-ring 300 in FIG. 3. Here, each direction is expressed as an angle and elevation in a sound helmet, as is shown in FIG. 6.

Each sound on the sound helmet may arrive at an arbitrary angle and elevation. The sounds at arbitrary angles along the sound ring are then mixed into a fixed number of positions on the sound helmet where virtual speakers have been placed. There may be a very large number of virtual speakers, such as 720 speakers, so that each sound can simply be moved to the nearest virtual speaker. It is more common to use a smaller number of virtual speakers, such as 11, 18 or 22 speakers arranged in various configurations that spread the virtual speakers around the sound helmet. If a sound lands directly on a virtual speaker it is simply mixed entirely into that virtual speaker. If a sound lands directly between two speakers it can be mixed proportionally between those two speakers. In the general case, a sound direction will be at an arbitrary point in the curved surface of the sound-helmet and will be mixed proportionally into the four surrounding speakers, which is the method used by mixer operation 709.

The sound is then transformed from the virtual speakers on the sound-helmet to the sound that would be perceived by human ears in this actual situation, called binaural sound. The converter operation 710 from virtual speakers to binaural sound is available from commercial software packages, such as the AudioCauldron Headphone Engine from Bit Cauldron Corporation. Control then transfers to query operation 711.

Binaural sound is intended for headphone listening. Query operation 711 checks if the user is wearing headphones. If the user is wearing headphones then the sound is ready to be sent onward through the process, and the binaural sound is queued for transmission to the listening participant $L_N$ and may be automatically transmitted thereafter.

If the user is not wearing headphones but is instead listening with physical speakers, i.e., the answer in query operation is NO, then we must cancel the crosstalk effect introduced by speakers. Control therefore transfers to operation 712. Crosstalk canceller operation 712 uses crosstalk cancellation available from commercial software packages, such as the AudioCauldron Speaker Engine from Bit Cauldron Corporation.

The binaural sound thus generated is then queued for transmission and transmitted to the listening participant $L_N$. It is to be understood that transmission to the listening participant $L_N$ may be done out of sequence, for example, after query of more participants, if there are no more participants to be accounted for. However, for the purposes of this description, transmission is described here.

The process as described to this point creates the direction sound for one listener. The process must be repeated to create the sound for each listener. All of this processes the sound for all listeners for a single short interval of time. This process must then be repeated for the next short interval of time. Typical short intervals of time are in the 1 to 500 millisecond range, such as 9, 10, or 11 milliseconds. The process checks for more participants, and then checks to see if the conference is still going. If so, the process repeats for the next interval of time. The processes described above may be performed in the cloud or much of the calculation processing may be pushed to the end user's device such as his or her computer, desktop, tablet, computer, smart phone, electronic glasses, or other information processing device.

From this description, it will be appreciated that certain aspects are embodied in the user devices, certain aspects are embodied in the server systems, and certain aspects are embodied in a client/server system as a whole. Embodiments disclosed can be implemented using hardware, programs of instruction, or combinations of hardware and programs of instructions.

In general, routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), or random access memory. In this description, various functions and operations are described as being performed by or caused by software code to simplify description. However, those skilled in the art will recognize what is meant by such expressions is that the functions result from execution of the code by a processor, such as a microprocessor.

Figure 9:
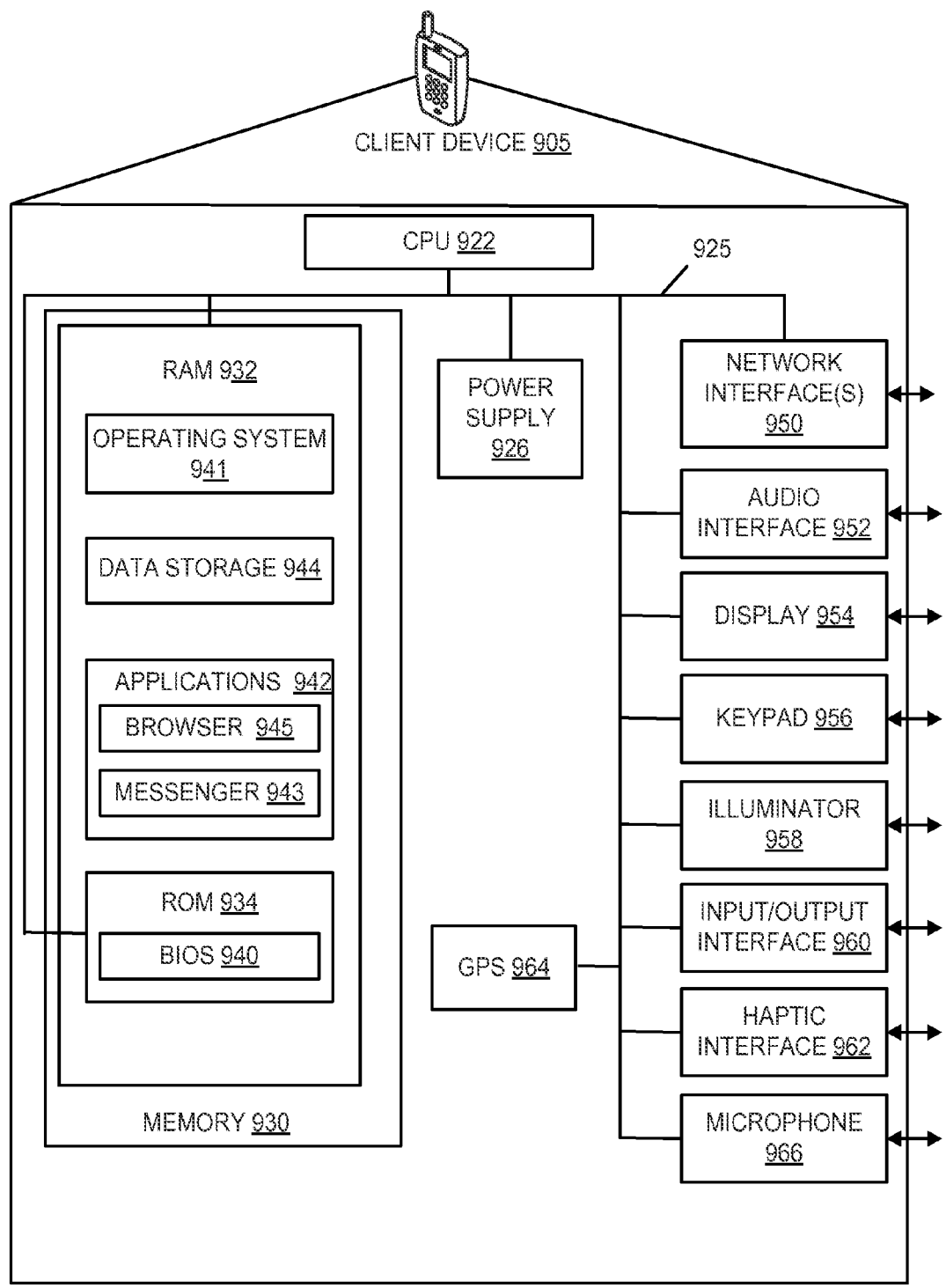
FIG. 9 shows an example of a schematic diagram illustrating a client device in accordance with an embodiment of the present disclosure.

FIG. 9 shows one example of a schematic diagram illustrating a client device 905 upon which an exemplary embodiment of the present disclosure may be implemented. Client device 905 may include a computing device capable of sending or receiving signals, such as via a wired or wireless network. A client device 905 may, for example, include a desktop computer or a portable device, such as a cellular telephone, a smartphone, a display pager, a radio frequency (RF) device, an infrared (IR) device, a Personal Digital Assistant (PDA), augmented reality glasses, a hand-held computer, a tablet computer, a laptop computer, a digital camera, a set top box, a wearable computer, an integrated device combining various features, such as features of the foregoing devices, or the like.

The client device 905 may vary in terms of capabilities or features. Claimed subject matter is intended to cover a wide range of potential variations. For example, a cell phone may include a numeric keypad or a display of limited functionality, such as a monochrome liquid crystal display (LCD) for displaying text, pictures, etc. In contrast, however, as another example, a web-enabled client device may include one or more physical or virtual keyboards, mass storage, one or more accelerometers, one or more gyroscopes, global positioning system (GPS) or other location-identifying type capability, of a display with a high degree of functionality, such as a touch-sensitive color 2D or 3D display, for example. Other examples included augmented reality glasses and tablets.

A client device 905 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

As shown in the example of FIG. 9, client device 905 may include one or more processing units (also referred to herein as CPUs) 922, which interface with at least one computer bus 925. A memory 930 can be persistent storage and interfaces with the computer bus 925. The memory 930 includes RAM 932 and ROM 934. ROM 934 includes a BIOS 940. Memory 930 interfaces with computer bus 925 so as to provide information stored in memory 930 to CPU 922 during execution of software programs such as an operating system 941, application programs 942 such as device drivers (not shown), and software messenger module 943 and browser module 945, that comprise program code, and/or computer-executable process steps, incorporating functionality described herein, e.g., one or more of process flows described herein. CPU 922 first loads computer-executable process steps from storage, e.g., memory 932, data storage medium/media 944, removable media drive, and/or other storage device. CPU 922 can then execute the stored process steps in order to execute the loaded computer-executable process steps. Stored data, e.g., data stored by a storage device, can be accessed by CPU 922 during the execution of computer-executable process steps.

Persistent storage medium/media 944 is a computer readable storage medium(s) that can be used to store software and data, e.g., an operating system and one or more application programs. Persistent storage medium/media 944 can also be used to store device drivers, such as one or more of a digital camera driver, monitor driver, printer driver, scanner driver, or other device drivers, web pages, content files, playlists and other files. Persistent storage medium/media 906 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Client device 905 can also include one or more of a power supply 926, network interface 950, audio interface 952, a display 954 (e.g., a monitor or screen), keypad 956, illuminator 958, I/O interface 960, a haptic interface 962, a GPS 964, and/or a microphone 966.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

FIG. 10 is a block diagram illustrating an internal architecture 1000 of an example of a computer, such as server computer and/or client device, in accordance with one or more embodiments of the present disclosure. A computer as referred to herein refers to any device with a processor capable of executing logic or coded instructions, and could be a server, personal computer, set top box, tablet, smart phone, pad computer or media device, or augmented reality glasses, to name a few such devices. As shown in the example of FIG. 10, internal architecture 1000 includes one or more processing units (also referred to herein as CPUs) 1012, which interface with at least one computer bus 1002. Also interfacing with computer bus 1002 are persistent storage medium/media 1006, network interface 1014, memory 1004, e.g., random access memory (RAM), run-time transient memory, read only memory (ROM), etc., media disk drive interface 1008 as an interface for a drive that can read and/or write to media including removable media such as floppy, CD-ROM, DVD, etc. media, display interface 1010 as an interface for a monitor or other display device, keyboard interface 1016 as interface for a keyboard, pointing device interface 1018 as an interface for a mouse or other pointing device, CD/DVD drive interface 1020, and miscellaneous other interfaces 1022, such as parallel and serial port interfaces, a universal serial bus (USB) interface, Apple's ThunderBolt and Firewire port interfaces, and the like.

Memory 1004 interfaces with computer bus 1002 so as to provide information stored in memory 1004 to CPU 1012 during execution of software programs such as an operating system, application programs, device drivers, and software modules that comprise program code, and/or computer-executable process steps, incorporating functionality described herein, e.g., one or more of process flows described herein. CPU 1012 first loads computer-executable process steps from storage, e.g., memory 1004, storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

As described above, persistent storage medium/media 1006 is a computer readable storage medium(s) that can be used to store software and data, e.g., an operating system and one or more application programs. Persistent storage medium/media 1006 can also be used to store device drivers, such as one or more of a digital camera driver, monitor driver, printer driver, scanner driver, or other device drivers, web pages, content files, playlists and other files. Persistent storage medium/media 1006 can further include program modules and data files used to implement one or more embodiments of the present disclosure.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although the disclosure has been provided with reference to specific exemplary embodiments, it will be evident that the various modification and changes can be made to these embodiments without departing from the broader spirit as set forth in the claims. For example, provision could be made for additional listening participants beyond the number of chairs in the virtual room. In such case, these listening participants would hear as if they were either in a predetermined one of the positions, or without the benefit of 3D sound. Accordingly, the specification and drawings are to be regarded in an illustrative sense rather than in a restrictive sense. All such changes, alternatives and equivalents in accordance with the features and benefits described herein, are within the scope of the present disclosure. Such changes and alternatives may be introduced without departing from the spirit and broad scope of my invention as defined by the claims below and their equivalents.

What is claimed is:

1. A computer implemented multi-dimensional sound conferencing method for a plurality of conference participants comprising:
   assigning, via a processor, each conference participant to a unique position on a computer generated map of one of a real or virtual venue; wherein the plurality of conference participants includes speaking participants and listening participants;
   determining a direction on the map of each participant from each other participant;
   receiving a voice sound from one of the speaking participants;
   leveling the received voice sound from the one speaking participant to a common leveled voice sound for the speaking participant;
   converting the leveled voice sound to a converted sound corresponding to the direction to each of the listening participants from the one speaking participant;
   transforming the converted sound to binaural sound for transmission to each listening participant; and
   after the transforming step, canceling a crosstalk effect in the binaural sound such that the binaural sound is configured to maintain accurate directional information when a listening participant is not using headphones.

2. The method according to claim 1 wherein the map is a virtual room.

3. The method according to claim 2 wherein the virtual room has a plurality of predefined unique positions.

4. The method according to claim 3 wherein a direction is determined in the virtual room from each predefined position to each other predefined position in the virtual room.

5. The method according to claim 2 wherein the sound from each speaking participant is assigned a virtual speaker associated with a direction from each listening participant.

6. The method according to claim 1 wherein the map includes a sound ring around each listening participant.

7. The method according to claim 5 wherein each virtual speaker is associated with a position around a sound ring around each listening participant.

8. The method according to claim 5 further comprising the virtual room having a plurality of walls defining the room.

9. The method according to claim 5 wherein reverberation is added to the received sound directed to each of the virtual speakers other than the virtual speaker associated with the speaking participant.

10. The method according to claim 8 wherein reverberation is added to the received sound directed to each of the virtual speakers other than the virtual speaker associated with the speaking participant.

11. The method according to claim 1 wherein the conference is a group conversation.

12. The method according to claim 1 wherein the multi-dimensional sound conferencing is three-dimensional sound conferencing.

13. A computerized method for simulating a three dimensional audio experience during a conference between a plurality of participants, the method comprising:
receiving, via a processor, a plurality of voice sounds from conference speaking and listening participants;
associating each voice sound with a unique one of the participants;
presenting to each participant, via a computer display communicating with the processor, a virtual map of a venue having a virtual room showing a plurality of different positions in the room equal to or greater than the number of conference participants;
each participant selecting a different position on the map within the virtual room;
leveling, via the processor, the received voice sound received from each participant to a common leveled voice sound;
converting the leveled voice sound to a converted sound corresponding to the direction to each of the listening participants from the speaking participant on the map;
transforming the converted sound to binaural sound for transmission to each listening participants; and
after the transforming step, canceling a crosstalk effect in the binaural sound such that the binaural sound is configured to maintain accurate directional information when a listening participant is not using headphones.

14. The method according to claim 13 further comprising determining a direction from each position in the room to each other position in the virtual room.

15. The method according to claim 14 further comprising associating a different speaking participant with each different position and wherein each converted sound is determined from the direction of the speaking participant associated with its position in the room.

16. A computer implemented multi-dimensional sound conferencing method for a plurality of conference participants comprising:
assigning, via a processor, each conference participant to a unique position on a map, wherein the plurality of conference participants includes speaking participants and listening participants;
dividing the map into blocks, wherein each block contains one or more contiguous groups of conference participants;
dividing the map into superblocks, wherein each superblock contains one or more contiguous groups of blocks;
determining a direction on the map of each participant from each other participant, each block from each other block, and each superblock from each other superblock;
receiving a voice sound from one of the speaking participants in one block;
leveling the received voice sound from the one speaking participant to a common leveled voice sound for the speaking participant;
converting the leveled voice sound to a converted sound corresponding to the direction to each of the listening participants in the one block or in any block adjacent to the one block;
transforming the converted sound to binaural sound for transmission to each listening participant in the one block or to a listening participant in a block adjacent to the one block; and
after the transforming step, canceling a crosstalk effect in the binaural sound such that the binaural sound is configured to maintain accurate directional information when a listening participant is not using headphones.

17. The method according to claim 16 further comprising:
receiving a voice sound from all speaking participants in a block;
mixing the voice sound from all the speaking participants in the block into one block voice sound;
leveling the block voice sound to a common leveled block voice sound for the block;
converting the leveled block voice sound to a converted block sound corresponding to the direction to each of the other blocks;
transforming the converted block sound to binaural block sound;
determining a latency of sound between the listening participant and all blocks except for the block containing the listening participant and blocks adjacent to the block containing the listening participant;
determining the expected latency of a transmission of the binaural block sound to the listening participant;
adding latency to the binaural block sound for transmission such that the transmission has the same latency as sound traveling through air over the predicted distance of the transmission to each listening participant.

18. The method according to claim 17 further comprising:
receiving a voice sound from all speaking participants in a superblock;
mixing the voice sound from all the speaking participants in the superblock into one superblock voice sound;
leveling the superblock voice sound to a common leveled superblock voice sound for the superblock;
attenuating the leveled superblock voice sound to an attenuated superblock voice sound such that the attenuated superblock voice sound is representative of a distance between any one superblock and each of the other superblocks;

converting the leveled and attenuated superblock voice sound to a converted superblock sound corresponding to the direction to each of the other superblocks;

transforming the converted superblock sound to binaural superblock sound;

determining a latency of sound between the listening participant and all superblocks except for the superblock containing the listening participant;

determining the expected latency of a transmission of the binaural superblock sound to the listening participant;

adding latency to the binaural superblock sound for the transmission such that the transmission has the same latency as sound traveling through air over the predicted distance of the transmission from the superblock to the superblock containing the listening participant.

19. The method according to claim 18 further comprising:

mixing the block voice sound from all of the blocks in a superblock into a mixed superblock voice sound;

leveling the mixed superblock voice sound to a common leveled superblock voice sound for the superblock;

attenuating the leveled superblock voice sound to an attenuated superblock voice sound such that the attenuated superblock voice sound is representative of a distance between any one superblock and each of the other superblocks;

converting the leveled and attenuated superblock voice sound to a converted superblock sound corresponding to the direction to each of the other superblocks;

transforming the converted superblock sound to binaural superblock sound;

determining a latency of sound between the listening participant and all superblocks except for the superblock containing the listening participant;

determining the expected latency of a transmission of the binaural superblock sound to the listening participant;

adding latency to the binaural superblock sound for the transmission such that the transmission has the same latency as sound traveling through air over the predicted distance of the transmission from the superblock to the superblock containing the listening participant.

* * * * *